US012312694B2

(12) United States Patent
Terashima et al.

(10) Patent No.: US 12,312,694 B2
(45) Date of Patent: May 27, 2025

(54) PRODUCTION METHOD FOR TREATMENT SOLUTION FOR FORMING INSULATING COATING, PRODUCTION METHOD FOR STEEL SHEET HAVING INSULATING COATING, AND PRODUCTION APPARATUS FOR TREATMENT SOLUTION FOR FORMING INSULATING COATING

(71) Applicant: JFE STEEL CORPORATION, Tokyo (JP)

(72) Inventors: Takashi Terashima, Tokyo (JP); Karin Kokufu, Tokyo (JP); Makoto Watanabe, Tokyo (JP); Toshito Takamiya, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1075 days.

(21) Appl. No.: 17/269,183

(22) PCT Filed: Jun. 27, 2019

(86) PCT No.: PCT/JP2019/025634
§ 371 (c)(1),
(2) Date: Feb. 17, 2021

(87) PCT Pub. No.: WO2020/036006
PCT Pub. Date: Feb. 20, 2020

(65) Prior Publication Data

US 2021/0269921 A1 Sep. 2, 2021

(30) Foreign Application Priority Data

Aug. 17, 2018 (JP) ................................ 2018-153520

(51) Int. Cl.
*C23C 22/73* (2006.01)
*B01F 27/81* (2022.01)
(Continued)

(52) U.S. Cl.
CPC .......... *C23C 22/73* (2013.01); *B01F 27/8111* (2022.01); *C23C 22/07* (2013.01);
(Continued)

(58) Field of Classification Search
None
See application file for complete search history.

(56) References Cited

U.S. PATENT DOCUMENTS

2011/0244220 A1* 10/2011 Garcia-Juan ........ C23C 18/1254 106/287.19
2012/0160372 A1 6/2012 Inbe et al.
(Continued)

FOREIGN PATENT DOCUMENTS

CN 1470672 A 1/2004
CN 101784698 A 7/2010
(Continued)

OTHER PUBLICATIONS

Silverson Laboratories. "Laboratory scale mixers" (2016), retrieved from https://silverson.com (Year: 2016).*
(Continued)

*Primary Examiner* — Jose I Hernandez-Kenney
(74) *Attorney, Agent, or Firm* — Oliff PLC

(57) ABSTRACT

A production method for a treatment solution for forming an insulating coating. The method includes mixing a solution A containing, on a $PO_4^{3-}$ basis, 0.20 mol/L or more and 10 mol/L or less of at least one of (i) phosphoric acid and (ii) a phosphate salt, and containing, on a metal basis, less than 0.50 mol/L of one or more particulate metal compounds, and a solution B containing, on a metal basis, 0.50 mol/L or more and 20.0 mol/L or less of the one or more particulate metal compounds, and containing, on a $PO_4^{3-}$ basis, less than 0.20 mol/L of at least one of (i) phosphoric acid and (ii) a phosphate salt, and stirring with a turbine stator-type high-
(Continued)

speed stirrer such that a peripheral speed of a turbine reaches 10 m/s or more within 60 seconds after starting the mixing of the solution A and the solution B.

16 Claims, 2 Drawing Sheets

(51) Int. Cl.

| | |
|---|---|
| ***C23C 22/07*** | (2006.01) |
| ***C23C 22/20*** | (2006.01) |
| ***C23C 22/22*** | (2006.01) |
| ***C23C 22/74*** | (2006.01) |
| ***C23C 22/82*** | (2006.01) |
| *C22C 38/00* | (2006.01) |
| *H01F 1/147* | (2006.01) |

(52) U.S. Cl.

CPC .............. *C23C 22/20* (2013.01); *C23C 22/22* (2013.01); *C23C 22/74* (2013.01); *C23C 22/82* (2013.01); *C22C 38/00* (2013.01); *H01F 1/147* (2013.01)

(56) References Cited

U.S. PATENT DOCUMENTS

| | | | | |
|---|---|---|---|---|
| 2012/0315675 | A1 * | 12/2012 | Medoff | C12P 19/02 435/141 |
| 2014/0247687 | A1 | 9/2014 | Mizuno et al. | |
| 2016/0305026 | A1 | 10/2016 | Terashima et al. | |
| 2019/0153240 | A1 * | 5/2019 | Kashima | C09D 7/61 |
| 2019/0271087 | A1 * | 9/2019 | Takeda | C23C 22/20 |

FOREIGN PATENT DOCUMENTS

| | | | | |
|---|---|---|---|---|
| CN | 102115881 | A | 7/2011 | |
| CN | 102119239 | A | 7/2011 | |
| CN | 106232870 | A | 12/2016 | |
| CN | 107923046 | A | 4/2018 | |
| DE | 41 28 648 | A1 | 3/1993 | |
| EP | 0933446 | A1 | 8/1999 | |
| EP | 1080795 | A2 | 3/2001 | |
| EP | 1378586 | A1 | 1/2004 | |
| EP | 2182091 | A1 | 5/2010 | |
| EP | 3135793 | A1 | 3/2017 | |
| EP | 3346025 | A1 | 7/2018 | |
| EP | 3514262 | A1 | 7/2019 | |
| JP | S48-39338 | A | 6/1973 | |
| JP | S50-79442 | A | 6/1975 | |
| JP | H03-094075 | A | 4/1991 | |
| JP | 2000-169972 | A | 6/2000 | |
| JP | 2004353075 | A * | 12/2004 | C23C 22/53 |
| JP | 2007-23329 | A | 2/2007 | |
| JP | 2014-195793 | A | 10/2014 | |
| JP | 2014-214368 | A | 11/2014 | |
| JP | 2017-511840 | A | 4/2017 | |
| JP | 2017-119797 | A | 7/2017 | |
| JP | 2017-137540 | A | 8/2017 | |
| JP | 2018-504516 | A | 2/2018 | |
| WO | 2010/069906 | A1 | 6/2010 | |
| WO | WO-2017150383 | A1 * | 9/2017 | C09D 1/00 |
| WO | 2018/074486 | A1 | 4/2018 | |

OTHER PUBLICATIONS

Shechter. What is a Colloid Mill & How Does It Compare to a Homogenizer. Nov. 4, 2016. Available at https://www.pion-inc.com. (Year: 2016).*

Sep. 28, 2021 Office Action issued in Chinese Patent Application No. 201980053049.4.

Sep. 17, 2019 International Search Report issued in International Application No. PCT/JP2019/025634.

Jul. 26, 2021 Extended European Search Report in European Patent Application No. 19850486.2.

Oct. 27, 2022 Extended European Search Report issued in European Patent Application No. 22185359.1.

Aug. 29, 2023 Written Decision on Registration issued in Korean Patent Application No. 2021-7004038.

Sep. 12, 2023 Office Action issued in Euopean Patent Application No. 19850486.2.

Nov. 17, 2021 Extended European Patent Application No. 19850486. 2.

Oct. 22, 2024 Office Action issued in European Application No. 22185359.1.

* cited by examiner

PRODUCTION METHOD FOR TREATMENT SOLUTION FOR FORMING INSULATING COATING, PRODUCTION METHOD FOR STEEL SHEET HAVING INSULATING COATING, AND PRODUCTION APPARATUS FOR TREATMENT SOLUTION FOR FORMING INSULATING COATING

TECHNICAL FIELD

This application relates to a production method for an insulating coating treatment solution containing phosphate ions and a metal compound, a production method for steel sheet having an insulating coating, and a production apparatus for a treatment solution for forming an insulating coating.

BACKGROUND

A phosphate salt coating containing a phosphate of a polyvalent metal, such as Al, Mg, or Ca, as a main component is commonly known as a heat-resistant insulating coating. To impart insulation, workability, and rust protection properties, a grain-oriented electrical steel sheet is typically provided with a forsterite-based undercoating formed during the final finish annealing and a phosphate salt-based top coating formed thereon.

These coatings, which are formed at a high temperature and have a low thermal expansion coefficient, apply tension to a steel sheet due to differences in thermal expansion coefficient between the steel sheet and the coatings when the temperature is lowered to room temperature, thereby gives the effect of reducing iron loss. For this reason, it is desired to apply as high tension as possible to a steel sheet.

To satisfy such a need, various coatings have been proposed. For example, Patent Literature 1 has proposed a coating primarily containing magnesium phosphate and colloidal silica. Moreover, Patent Literature 2 has proposed a coating primarily containing aluminum phosphate, colloidal silica, and one or two or more of chromic anhydride and chromate salts. In both the literature, chromic acids, such as chromic anhydride, a chromate salt, and a dichromate salt, are used to avoid deterioration in resistance to moisture absorption, which is a problem unique to phosphate salt coatings, or to reduce the thermal expansion coefficient.

Meanwhile, due to a growing interest to the environmental protection in recent years, there has been an increasing need for products free of hazardous substances, such as chromium and lead. Accordingly, the development of chromium-free coatings was desired for grain-oriented electrical steel sheets as well. However, chromium-free was unsuccessful since chromium-free coatings cause problems of considerable deterioration in resistance to moisture absorption and insufficient applied tension.

As a method of resolving the problems of deterioration in resistance to moisture absorption and/or insufficient applied tension, Patent Literature 3 has disclosed a method of adding an oxide colloidal substance to a phosphate salt and colloidal silica. Patent Literature 4 has disclosed a technique of incorporating a colloidal compound containing a metal element, such as Fe, Al, Ga, Ti, or Zr, into a phosphate salt and colloidal silica. Patent Literature 5 has disclosed a technique of incorporating particles, such as $Al_2O_3$, $TiO_2$, or $ZrO_2$, into a phosphate salt and silica. Patent Literature 6 has disclosed a technique of incorporating fine particles of a zirconium phosphate-based compound into a phosphate salt and colloidal silica. Patent Literature 7 has disclosed a technique of including a metal phosphate, colloidal silica nanoparticles, hollow nanoparticles, ceramic nanofibers, and mesoporous nanoparticles.

CITATION LIST

Patent Literature

PTL 1: Japanese Unexamined Patent Application Publication No. 50-79442

PTL 2: Japanese Unexamined Patent Application Publication No. 48-39338

PTL 3: Japanese Unexamined Patent Application Publication No. 2000-169972

PTL 4: Japanese Unexamined Patent Application Publication No. 2007-23329

PTL 5: Japanese Unexamined Patent Application Publication (Translation of PCT Application) No. 2017-511840

PTL 6: Japanese Unexamined Patent Application Publication No. 2017-137540

PTL 7: Japanese Unexamined Patent Application Publication (Translation of PCT Application) No. 2018-504516

SUMMARY

Technical Problem

According to the techniques described in Patent Literature 3 to 7, however, it was impossible to achieve satisfactory characteristics in a stable manner due to large variations in resistance to moisture absorption or applied tension.

The disclosed embodiments were made in view of the above, and an object is to provide a production method for a treatment solution for forming an insulating coating, in which a technique of enhancing applied tension and resistance to moisture absorption is applicable in a stable manner to the treatment solution that is for forming an insulating coating and that contains phosphoric acid and/or a phosphate salt and a particulate metal compound, as well as to provide a production method for an electrical steel sheet having an insulating coating using the treatment solution for forming an insulating coating and a production apparatus for a treatment solution for forming an insulating coating.

Solution to Problem

To resolve the above-mentioned problems, the present inventors obtained the findings below by adding a particulate metal compound ($ZrO_2$: average particle size of 100 nm) to a treatment solution for forming an insulating coating containing phosphoric acid and/or a phosphate salt as a main component; forming coatings; and comparing steel sheet samples between the cases in which satisfactory characteristics (coating tension of 8.0 MPa or more, amount of phosphorus leaching of 150 μg/150 $cm^2$ or less) were achieved and the cases in which such satisfactory characteristics were not achieved.

FIG. 1 shows the result observed by an SEM of the surface of a steel sheet sample for which satisfactory characteristics were achieved, whereas FIG. 2 shows the result observed by an SEM of the surface of a steel sheet sample for which satisfactory characteristics were not achieved. On the surface of a steel sheet sample for which satisfactory results were not obtained, many protrusions and the resulting cracks were observed. Accordingly, the present inventors investigated the causes for the formation of protrusions and observed large aggregates of $ZrO_2$ at the protrusions. By further investigation into the causes for the formation of aggregates, it was found that $ZrO_2$ particles aggregate due to pH fluctuations and the like during mixing of raw materials of a treatment solution for forming an insulating coating, which are an aqueous solution containing phosphate ions, such as an aluminum phosphate aqueous solution or a magnesium phosphate aqueous solution, and a dispersion of $ZrO_2$ particles.

To avoid such aggregation, it is possible, for example, to subject the surface of a particulate metal compound to coating treatment depending on the properties of components in a treatment solution to be prepared. However, this requires undue trial and error and increases the production cost even if the development of such treatment will be possible. Accordingly, as an inexpensive method, the present inventors came up with a method of producing an insulating coating treatment solution, in which the aggregate density on a steel sheet surface after application and baking can be lowered in a stable manner to the extent without impairing insulating coating performance, thereby arriving at the disclosed embodiments. Here, the aggregate density on a steel sheet surface after application and baking without impairing insulating coating performance is 1.0 unit/10,000 $\mu m^2$ or less.

Specifically, the constitution of the disclosed embodiments is summarized as follows.

[1] A production method for a treatment solution for forming an insulating coating, the treatment solution containing phosphoric acid and/or a phosphate salt and one or more particulate metal compounds, including: mixing a solution A containing, on a $PO_4^{3-}$ basis, 0.20 mol/L or more and 10 mol/L or less of phosphoric acid and/or the phosphate salt and containing, on a metal basis, less than 0.50 mol/L of the particulate metal compounds and a solution B containing, on a metal basis, 0.50 mol/L or more and 20.0 mol/L or less of the particulate metal compounds and containing, on a $PO_4^{3-}$ basis, less than 0.20 mol/L of phosphoric acid and/or the phosphate salt; and stirring with a turbine stator-type high-speed stirrer such that a peripheral speed of a turbine reaches 10 m/s or more within 60 seconds after starting the mixing of the solution A and the solution B.

[2] The production method for a treatment solution for forming an insulating coating according to [1], further including, after the stirring with the high-speed stirrer, performing dispersion treatment with a high-pressure disperser at a pressure of 20 MPa or more.

[3] The production method for a treatment solution for forming an insulating coating according to [1] or [2], where the treatment solution for forming an insulating coating further contains colloidal silica.

[4] The production method for a treatment solution for forming an insulating coating according to any one of [1] to [3], where the particulate metal compounds contain one or two or more elements selected from Mg, Al, Ti, Zn, Y, Zr, and Hf.

[5] The production method for a treatment solution for forming an insulating coating according to any one of [1] to [4], where the particulate metal compounds include at least one or more oxides.

[6] The production method for a treatment solution for forming an insulating coating according to any one of [1] to [4], where the particulate metal compounds include at least one or more nitrides.

[7] The production method for a treatment solution for forming an insulating coating according to any one of [1] to [6], where the particulate metal compounds have a particle size of 3.0 nm or more and 2.0 μm or less.

[8] A production method for a steel sheet having an insulating coating including: applying a treatment solution for forming an insulating coating obtained by the production method according to any one of [1] to [7] to a surface of the steel sheet; and then performing baking treatment.

[9] The production method for a steel sheet having an insulating coating according to [8], where the steel sheet is a grain-oriented electrical steel sheet.

[10] A production apparatus for a treatment solution for forming an insulating coating, including: a mixing tank for mixing a solution A containing, on a $PO_4^{3-}$ basis, 0.20 mol/L or more and 10 mol/L or less of phosphoric acid and/or a phosphate salt and containing, on a metal basis, less than 0.50 mol/L of a particulate metal compound and a solution B containing, on a metal basis, 0.50 mol/L or more and 20.0 mol/L or less of the particulate metal compound and containing, on a $PO_4^{3-}$ basis, less than 0.20 mol/L of phosphoric acid and/or the phosphate salt; and a turbine stator-type high-speed stirrer, where stirring is performed with the turbine stator-type high-speed stirrer such that a peripheral speed of a turbine reaches 10 m/s or more within 60 seconds after starting the mixing of the solution A and the solution B.

[11] The production apparatus for a treatment solution for forming an insulating coating according to [10], further including a circulation channel for circulating a solution after the stirring with the high-speed stirrer to the mixing tank.

[12] The production apparatus for a treatment solution for forming an insulating coating according to [10] or [11], further including a particle size distribution analyzer for measuring particle size distribution of a solution after the stirring with the high-speed stirrer.

Advantageous Effects

According to the disclosed embodiments, it is possible to produce a treatment solution for forming an insulating coating without generating, on a surface after application and baking, aggregates that impair coating performance and thus to obtain an insulating coating having high applied tension and resistance to moisture absorption at a low cost in a stable manner.

DETAILED DESCRIPTION

Figure 1:
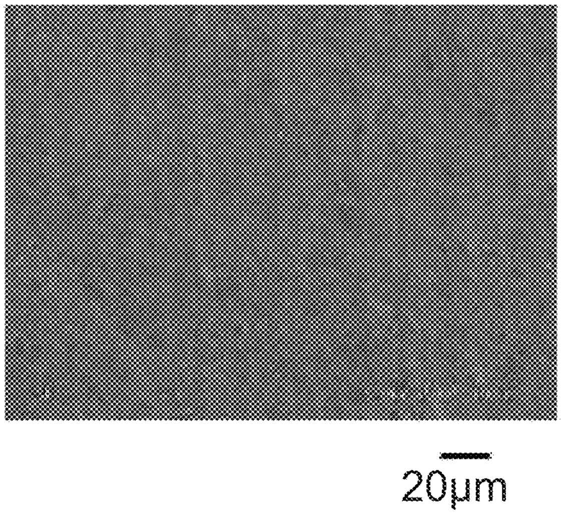
FIG. 1 is the result observed by an SEM of the surface of a steel sheet sample for which satisfactory characteristics were achieved.
Figure 2:
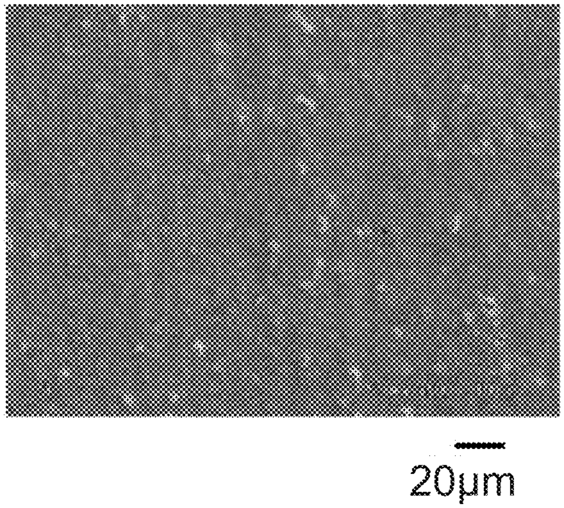
FIG. 2 is the result observed by an SEM of the surface of a steel sheet sample for which satisfactory characteristics were not achieved.

Hereinafter, the experimental results underlying the disclosed embodiments will be described.

As a material to which a treatment solution for forming an insulating coating is to be applied and baked, a 0.23 mm-thick grain-oriented electrical steel sheet that has been produced by a publicly known method and has a finish-annealed forsterite coating was used. A treatment solution for forming an insulating coating was produced by the following method. First, as a solution A, 30 g of an aqueous monomagnesium phosphate solution, on a solids content basis, and 20 g of colloidal silica, on a solids content basis, were added to 250 mL of pure water. Here, the solution A contained 1.10 mol/L of phosphate ions and no particulate metal compound added. Moreover, as a solution B, a particulate metal compound, 150 mL of a 15 mass % of $ZrO_2$ sol, on a solids content ($ZrO_2$) basis, was prepared. Here, the solution B contained 1.36 mol/L of the particulate metal compound, on a metal (Zr) basis, and no phosphate ions added. Subsequently, the solution A and the solution B were mixed by either of the two stirring methods shown in Table 1 to produce a treatment solution for forming an insulating coating.

As a propeller stirrer, a Tornado stirrer from AS ONE Corporation equipped with a propeller-type stirring blade of ø100 mm was used at 3,000 rpm. Further, as a turbine stator-type stirrer, an L5M-A Laboratory Mixer from Silverson Machines, Inc. was used at 5,000 rpm. These stirrers are different in size of a rotating object, but the rotation number was set in each stirrer such that a peripheral speed at the tip of the rotating object was 15.7 m/s.

Each prepared treatment solution was applied at a total coating weight after drying for both surfaces of 10 $g/m^2$, then dried in a drying furnace at 300° C. for 1 minute, and subjected to heat treatment (800° C., 2 minutes, 100% $N_2$) as flattening annealing as well as baking of insulating coatings. Subsequently, specimens for the tests described hereinafter were obtained by cutting. Here, specimens for an applied tension test were further subjected to stress relief annealing (800° C., 2 hours, 100% $N_2$ atmosphere) later.

An applied tension and resistance to moisture absorption were investigated for the thus-obtained specimens. The applied tension was regarded as a tension in the rolling direction. The applied tension was calculated using the formula (I) below, for a specimen having a length in the rolling direction of 280 mm and a length in the direction perpendicular to the rolling direction of 30 mm, after peeling an insulating coating on one surface with an aqueous sodium hydroxide solution while masking an insulating coating on the other surface with an adhesive tape to prevent its removal, then fixing 30 mm in one end of the specimen, and measuring the magnitude of deflection for the 250 mm-portion of the specimen as a measuring length.

Tension applied to steel sheet [MPa]=Young's modulus of steel sheet [GPa]×sheet thickness [mm]×magnitude of deflection [mm]+(measurement length [mm])$^2$×$10^3$ formula (I)

Here, the Young's modulus of steel sheet was set to 132 GPa. An applied tension of 8.0 MPa or more was evaluated as satisfactory (excellent in coating tension).

The resistance to moisture absorption was evaluated by a leaching test of phosphorus. In this test, 3 specimens of 50 mm×50 mm were boiled in distilled water at 100° C. for 5 minutes to measure the amount of phosphorus leaching [μg/150 $cm^2$] and evaluated as the ease of dissolution in water of an insulating coating. The amount of P (phosphorus) leaching of 150 [μg/150 $cm^2$] or less was evaluated as satisfactory (excellent in resistance to moisture absorption). The measurement method for the amount of leached P is not particularly limited, and the amount of leached P may be measured through quantitative analysis by ICP atomic emission spectroscopy, for example.

Table 1 shows measured results of the applied tension and the amount of phosphorus leached.

TABLE 1

| No. | Stirring method (stirrer) | Time from mixing until start of treatment (s) | Applied tension (MPa) | Amount of phosphorus leached (μg/150 $cm^2$) |
|---|---|---|---|---|
| 1 | Propeller stirrer | 10 | 7.1 | 1132 |
| 2 | Turbine stator-type stirrer | 30 | 12.3 | 12 |

The results in Table 1 reveals that an insulating coating having satisfactory applied tension and resistance to moisture absorption can be obtained by preparing a treatment solution for forming an insulating coating by using a turbine stator-type stirrer.

Next, the reasons for limiting requirements in each constitution of the disclosed embodiments will be presented.

First, a production method for a treatment solution for forming an insulating coating of the disclosed embodiments will be described. The treatment solution for forming an insulating coating needs to contain phosphate ions (phosphoric acid and/or a phosphate salt) and a particulate metal compound. Phosphate ions (phosphoric acid and/or a phosphate salt) are an essential component for forming a backbone of an insulating coating by polymerizing through dehydration-condensation reactions in the drying/baking process. Such polymerized phosphoric acid is readily hydrolyzed through reactions with moisture or the like in the air and thus inferior in resistance to moisture absorption. However, it is possible to suppress hydrolysis reactions by incorporating a particulate metal compound. Accordingly, a particulate metal compound is also an essential component in the disclosed embodiments.

Phosphate ions tend to be physically and chemically adsorbed onto the surface of a particulate metal compound, and inadvertent mixing thereof causes aggregation of the particulate metal compound. For this reason, it is required to limit the contents thereof in solutions (raw material solutions) before mixing.

Here, phosphate ions can take a plurality of forms in an aqueous solution, and it includes, not only $PO_4^{3-}$, but also hydrogen phosphate ions, such as $HPO_4^{2-}$ and $H_2PO_4^{-}$.

As described above, solutions (raw material solutions) before mixing in the disclosed embodiments are a solution A containing, on a $PO_4^{3-}$ basis, 0.20 mol/L or more and 10 mol/L or less of phosphoric acid and/or a phosphate salt and containing, on a metal basis, less than 0.50 mol/L of a particulate metal compound; and a solution B containing, on a metal basis, 0.50 mol/L or more and 20.0 mol/L or less of the particulate metal compound and containing, on a $PO_4^{3-}$ basis, less than 0.20 mol/L of phosphoric acid and/or the phosphate salt.

When the content of phosphoric acid and/or a phosphate salt, on a $PO_4^{3-}$ basis, is less than 0.20 mol/L in the solution A, the amount of phosphate ions in the solution after mixing with stirring and dispersion treatment described hereinafter is too small to form a sufficiently thick coating, thereby impairing insulation properties. Meanwhile, when the content of phosphoric acid and/or the phosphate salt, on a $PO_4^{3-}$ basis, exceeds 10.0 mol/L, excessively present phosphate ions make it difficult to disperse a particulate metal compound even by the stirring treatment of the disclosed embodiments. For these reasons, the content of phosphoric acid and/or the phosphate salt, on a $PO_4^{3-}$ basis, is set to 0.20 mol/L or more and 10.0 mol/L or less in the solution A. Moreover, it is needed to set the content of the particulate metal compound, on a metal basis, to less than 0.50 mol/L in the solution A. When the content of the particulate metal compound, on a metal basis, is 0.50 mol/L or more, aggregates are generated. The content is preferably less than 0.30 mol/L.

In a similar manner, the content of phosphoric acid and/or the phosphate salt, on a $PO_4^{3-}$ basis, needs to be set to less than 0.20 mol/L in the solution B. When the content of the particulate metal compound is less than 0.50 mol/L in the solution B, the amount of liquid for mixing a sufficient amount of the particulate metal compound increases relative to phosphate ions and excessively lowers the concentration of phosphate ions in the solution after mixing. Consequently, a sufficiently thick coating cannot be formed, thereby impairing insulation properties. Meanwhile, when the content of the particulate metal compound exceeds 20.0 mol/L, the particulate metal compound molecules excessively come close to each other in a treatment solution and readily aggregate. For these reasons, the content of the particulate metal compound in the solution B is set to 20.0 mol/L or less and preferably 18.0 mol/L or less.

To avoid the risk of aggregation, it is ideal to keep phosphoric acid and/or a phosphate salt and a particulate metal compound in separate solutions when in the state without controlled stirring. When the content of phosphoric acid and/or a phosphate salt, on a $PO_4^{3-}$ basis, is less than 0.20 mol/L or the content of a particulate metal compound, on a metal basis, is less than 0.50 mol/L, phosphoric acid and/or the phosphate salt and the particulate metal compound may be mixed in a same solution since aggregation does not occur regardless of mixing and stirring methods. The content of the particulate metal compound, on a metal basis, is preferably less than 0.30 mol/L.

Through mixing of separately prepared solution A and solution B by the method described hereinafter, it is possible to prevent aggregation of a particulate metal compound due to phosphate ions and to achieve dispersing without generating, on a surface after application and baking, aggregates that impair coating performance. Moreover, it is also possible to mix, in advance, each solution A and solution B with a substance without concern of aggregation. For example, it is possible to mix, in advance, colloidal silica and the like with the solution A and the solution B. In this case, the stirring method is not particularly limited, and a general-purpose mixing mode, such as a propeller stirrer or, in laboratory scale, a magnetic stirrer or a stirring rod, is satisfactorily employed.

Figure 3:
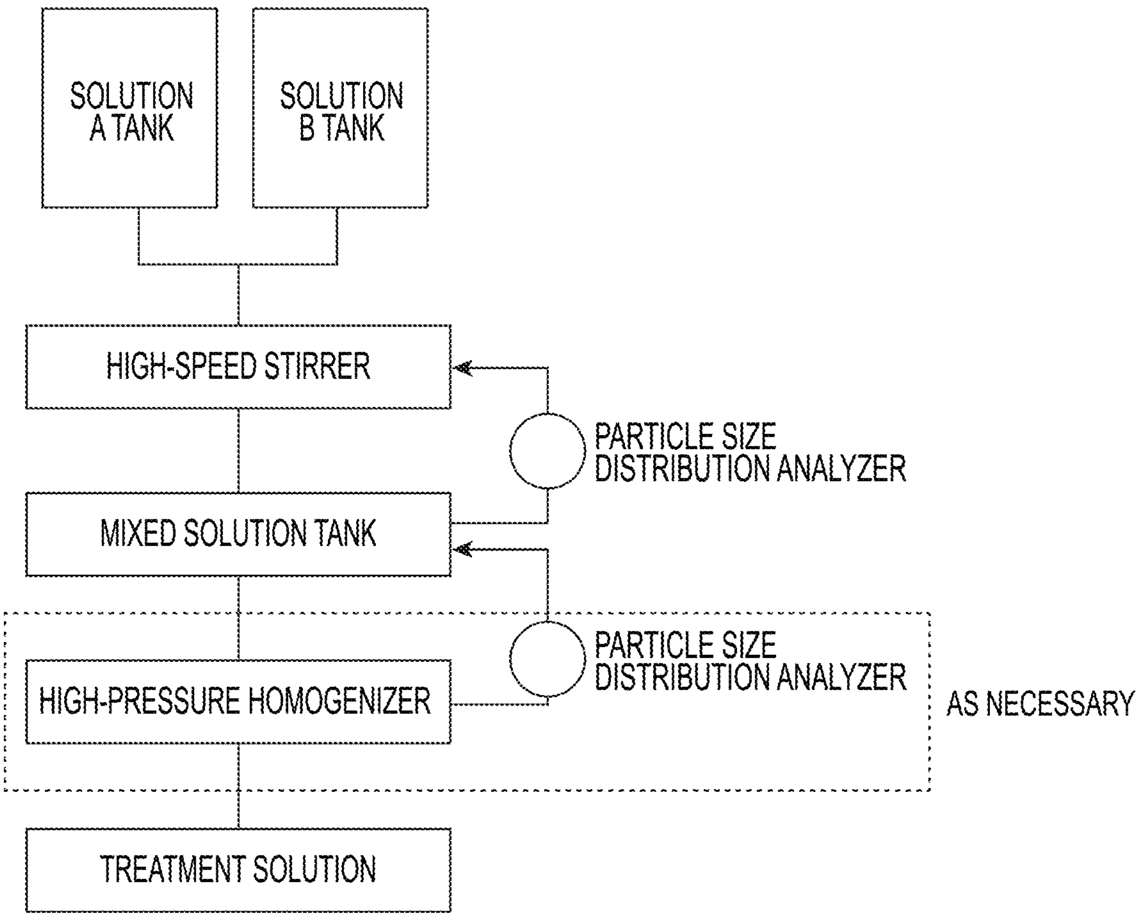
FIG. 3 is a schematic diagram of a production apparatus for a treatment solution for forming an insulating coating of the disclosed embodiments.

For mixing the above-described solution A and solution B, it is needed to stir with a turbine stator-type (also referred to as rotor-stator type) high-speed stirrer within 60 seconds after staring the mixing. Aggregates of a particulate metal compound harden in the state without stirring for more than 60 seconds from the start of the mixing, thereby making it difficult to disperse the aggregated particulate metal compound even through stirring with a turbine stator-type high-speed stirrer. Here, the solution A and the solution B may be stirred with a turbine stator-type high-speed stirrer within 60 seconds and more preferably within 45 seconds after starting the mixing. Accordingly, as shown in FIG. 3, any constitution may be adopted provided that a tank for the solution A (solution A tank) and a tank for the solution B (solution B tank) are prepared and the solution A and the solution B are transferred from the respective solution A tank and solution B tank to the high-speed stirrer independently or after mixing on the way. Further, a mixed solution tank after mixing the solution A and the solution B may be connected with the turbine stator-type high-speed stirrer via a pipe, for example. Here, when a connection portion, such as a pipe, is provided, flow rates and/or channels may be appropriately designed such that the solution A and the solution B are stirred with the high-speed stirrer within 60 seconds after starting the mixing.

Moreover, a circulation channel may be further included for circulating a solution after stirring with the high-speed stirrer by feeding to the high-speed stirrer again from the mixed solution tank. By circulating a solution after stirring, it is possible to attain a satisfactory dispersion state even for raw materials that are hard to disperse.

A treatment solution for forming an insulating coating that has been produced by stirring the solution A and the solution B with a turbine stator-type high-speed stirrer may be held until application, while left standing, stirred by a common method, or stirred with a turbine stator-type high-speed stirrer, although not particularly limited thereto. As an apparatus used for mixing and dispersing a particulate metal compound, a media disperser, such as a bead mill, is unsuitable due to the risk of contamination with impurities. Among medialess dispersers, a turbine stator-type high-speed stirrer is suitable for the disclosed embodiments since reliable separation is possible between a processed solution (a solution that has passed through the stator) and an unprocessed solution (a solution that has yet to pass through the stator) by collecting only a solution that has passed through the stator. A faster peripheral speed at the stirring blade tip is more preferable. In the disclosed embodiments, the peripheral speed of a turbine is set to 10 m/s or more and preferably 40 m/s or more.

Exemplary turbine stator-type high-speed stirrers include high shear mixers from Silverson Machines, Inc., Cavitron from Pacific Machinery & Engineering Co., Ltd., and Quadro Ytron Z from Powrex Corporation.

Herein, the expression "the start of mixing of the solution A and the solution B" means "after the solution A and the solution B start to come into contact with each other."

When it is desirable to further increase the degree of dispersion of a particulate metal compound, treatment with a high-pressure homogenizer is preferably performed after treatment with a turbine stator-type high-speed stirrer. A high-pressure homogenizer disperses solids by applying a high pressure to a solution to be treated and then releasing the pressure while applying shearing force or the like to the solution. Such a disperser is an apparatus called wet jet mill, for example, and exemplary commercial apparatuses include Star Burst from Sugino Machine Limited, NanoVater from Yoshida Kikai Co., Ltd., and Nano Jet Pul from Jokoh Co., Ltd. A higher pressure during the treatment is more preferable. The pressure is preferably 20 MPa or more and further preferably 50 MPa or more.

The disclosed embodiments may further include a particle size distribution analyzer for measuring the particle size distribution of a solution after stirring with a high-speed stirrer. Such a particle size distribution analyzer is not particularly limited, and examples include a particle size distribution analyzer utilizing ultrasonic waves in the case of in-line measurement of particle size distribution. Here, when a high-pressure homogenizer is included, a particle size distribution analyzer may be installed to measure the particle size distribution of a solution after treatment with the high-speed disperser. It is further preferable to give feedback to the operating conditions of a high-speed stirrer and/or a high-pressure homogenizer such that the measured values of particle size distribution fall within set ranges (see FIG. 3).

In the disclosed embodiments, a treatment solution for forming an insulating coating may further contain colloidal silica to increase applied tension. Colloidal silica may be contained in the solution A and/or the solution B, may be incorporated during mixing of the solution A and the solution B, or may be incorporated after mixing the solution A and the solution B (may be incorporated either before or after dispersion treatment). Moreover, colloidal silica may be incorporated a plurality of times. The content of colloidal silica, on a $SiO_2$ solids content basis, is preferably 60 to 200 parts by mass relative to 100 parts by mass of phosphoric acid and/or a phosphate salt, on a $PO_4^{3-}$ basis.

As phosphate ion sources for the solution A and the solution B, it is preferable to use an aqueous orthophosphoric acid ($H_3PO_4$) solution or one or two or more selected from phosphates of Mg, Ca, Ba, Sr, Zn, Al, and Mn. Alkali metal (Li, Na, or K, for example) phosphates are unsuitable due to considerably inferior resistance to moisture absorption. One phosphate salt is commonly used, but it is possible to closely control the physical property values of an insulating coating by using two or more mixed phosphate salts. As the type of phosphate salts, monobasic phosphates (dihydrogen phosphates) are readily available and thus suitable.

In view of trapping ability of phosphate ions, a particulate metal compound of a metal element having a large valence number or a small ionic radius is preferable, and specifically, a particulate metal compound containing one or two or more elements selected from Mg, Al, Ti, Zn, Y, Zr, and Hf is preferable. Moreover, the particulate metal compound is preferably in the form of an oxide or a nitride, and in particular, those that are less likely to react with water are more preferable. Here, regarding the definition of metals, boron (B), silicon (Si), germanium (Ge), arsenic (As), antimony (Sb), and tellurium (Te) are semimetals and are not included in metals.

In view of trapping ability of phosphate ions, a smaller particle size of the particulate metal compound is preferable due to a larger specific surface area. Meanwhile, in view of surface energy, a larger particle size enhances the dispersibility of the particulate metal compound in a treatment solution for forming an insulating coating. Accordingly, the particle size of the particulate metal compound is preferably set to 3.0 nm or more and 2.0 μm or less in the disclosed embodiments. The particle size herein is not a particle size when the metal compound aggregates in a treatment solution but rather an average particle size of equivalent circles having an area of each particle observed/imaged by an SEM or a TEM. Here, primary particles sintered and integrated into one body are regarded as one particle.

A treatment solution for forming an insulating coating obtained as described above is applied to the surface of a steel sheet and baked to form an insulating coating. The coating weight after baking of such insulating coatings is preferably set to 4.0 to 30 $g/m^2$ as the total coating weight on both surfaces. When the coating weight is less than 4.0 $g/m^2$, the interlaminar resistance decreases. Meanwhile, when the coating weight exceeds 30 $g/m^2$, the stacking factor decreases. The weight is further preferably set to 4.0 to 15 $g/m^2$.

The baking of an insulating coating is preferably performed also as flattening annealing in a temperature range of 800° C. to 1,000° C. for a soaking time of 10 to 300 seconds. When the baking temperature is excessively low or the soaking time is excessively short, insufficient flattening lowers the yield due to defective shapes. Meanwhile, when the baking temperature is excessively high or the soaking time is excessively long, excessively strong effects of the flattening annealing causes creep deformation, thereby impairing magnetic characteristics.

A steel sheet to which a treatment solution for forming an insulating coating of the disclosed embodiments is to be applied, in other words, a steel sheet in the disclosed embodiments may be any steel sheet, such as carbon steel, high tensile strength steel sheet, or stainless steel sheet, but is particularly suitably a grain-oriented electrical steel sheet.

Further, the preferable component composition of a steel sheet, to which a treatment solution for forming an insulating coating is to be applied, in the disclosed embodiments will be described by means of an exemplary production method for a grain-oriented electrical steel sheet.

The components of a steel sheet preferably fall within the following ranges.

C: 0.001 to 0.10 Mass %

C is a useful component for the formation of Goss-oriented grains. To effectively exert such an effect, 0.001 mass % or more of C needs to be contained. Meanwhile, when C content exceeds 0.10 mass %, insufficient decarburization results even through decarburization annealing. Accordingly, C content is preferably within the range of 0.001 to 0.10 mass %.

Si: 1.0 to 5.0 Mass %

Si is a component necessary for increasing electric resistance to reduce iron loss and stabilizing the BCC structure of iron to allow high-temperature heat treatment. At least 1.0 mass % of Si needs to be contained. Meanwhile, Si content exceeding 5.0 mass % makes cold rolling difficult. Accordingly, Si content is preferably 1.0 to 5.0 mass %.

Mn: 0.01 to 1.0 Mass %

Mn not only effectively contributes to reduce hot shortness of steel but also fulfils a function as an inhibitor through formation of precipitates, such as MnS and MnSe when S and Se coexist. When Mn content is less than 0.01 mass %, the above-mentioned effects are unsatisfactory. Meanwhile, when Mn content exceeds 1.0 mass %, the grain size of precipitates, such as MnSe, coarsens, thereby losing the effect as an inhibitor. Accordingly, Mn content is preferably within the range of 0.01 to 1.0 mass %.

Sol. Al: 0.003 to 0.050 Mass %

Al is a useful component that forms AlN in steel and fulfills an inhibitor function as a dispersed second phase. When the amount added is less than 0.003 mass %, it is impossible to ensure a sufficient amount of precipitates. Meanwhile, when more than 0.050 mass % of Al is added, the inhibitor function is lost due to coarsely precipitated AlN. Accordingly, Al content as sol. Al is preferably within the range of 0.003 to 0.050 mass %.

N: 0.001 to 0.020 Mass %

N is also a component necessary for forming AlN in the same manner as Al. When the amount added is less than 0.001 mass %, AlN is precipitated insufficiently. Meanwhile, when more than 0.020 mass % of N is added, blistering or the like results during slab heating. Accordingly, N content is preferably within the range of 0.001 to 0.020 mass %.

One or two selected from S and Se: 0.001 to 0.05 mass %

S and Se are useful components that form MnSe, MnS, $Cu_2$-xSe, or $Cu_2$-xS through bonding with Mn or Cu and fulfill an inhibitor function as a dispersed second phase in steel. When the total content of S and Se is less than 0.001 mass %, the effect of addition is poor. Meanwhile, the total content exceeding 0.05 mass % causes not only incomplete solid solution during slab heating but also defects on a product surface. Accordingly, in both cases of single addition and combined addition, the total content is preferably within the range of 0.001 to 0.05 mass %.

One or two or more selected from Cu: 0.01 to 0.2 mass %, Ni: 0.01 to 0.5 mass %, Cr: 0.01 to 0.5 mass %, Sb: 0.01 to 0.1 mass %, Sn: 0.01 to 0.5 mass %, Mo: 0.01 to 0.5 mass %, and Bi: 0.001 to 0.1% mass It is possible to further improve magnetic properties through addition of an element that acts as an auxiliary inhibitor. The above-mentioned elements are examples of such an element in terms of grain size and tendency toward surface segregation. When the content of any of these elements is less than the above-mentioned addition amount, such an effect cannot be obtained. Meanwhile, since defective coating appearance and/or secondary recrystallization failure tend to occur when the content of any of these elements exceeds the above-mentioned addition amount, the above-mentioned ranges are preferable.

Further, it is possible to further increase inhibitory ability and achieve higher magnetic flux density in a stable manner by adding to steel, in addition to the above-mentioned components, one or two or more selected from B: 0.001 to 0.01 mass %, Ge: 0.001 to 0.1 mass %, As: 0.005 to 0.1 mass %, P: 0.005 to 0.1 mass %, Te: 0.005 to 0.1 mass %, Nb: 0.005 to 0.1 mass %, Ti: 0.005 to 0.1 mass %, and V: 0.005 to 0.1 mass %.

The balance is Fe and incidental impurities.

A steel having the above-described suitable component composition is refined through a publicly known refining process and formed into a steel slab by a continuous casting method or an ingot casting and slabbing rolling method. The steel slab is then hot rolled into a hot-rolled sheet, subjected to hot band annealing as necessary, and cold rolled once or twice or more via intermediate annealing into a cold-rolled sheet having a final sheet thickness. Subsequently, the cold-rolled sheet is subjected to primary recrystallization annealing and decarburization annealing and, after applying an annealing separator containing MgO as a main component, subjected to final finish annealing to form a forsterite-based coating layer. Later, a steel sheet can be produced by a production method consisting of a series of steps including applying a treatment solution for forming an insulating coating obtained by the production method of the disclosed embodiments and subjecting to flattening annealing also for baking. As production conditions other than the production conditions for the treatment solution for forming an insulating coating and the above-mentioned baking conditions for the treatment solution for forming an insulating coating, publicly known conditions may be adopted without any particular limitation. Moreover, it is also possible to form an insulating coating by applying a separator containing $Al_2O_3$ or the like as a main component after the decarburization annealing without forming forsterite after the final finish annealing; then forming a primarily crystalline coating by a method, such as CVD, PVD, sol-gel process, or steel sheet oxidation; and applying a treatment solution for forming an insulating coating obtained by the production method of the disclosed embodiments.

EXAMPLES

Example 1

<Investigation of Treatment Solutions for Forming Insulating Coatings>

As a raw material of a treatment solution for forming an insulating coating, each solution A shown in Table 2 was prepared by using, as shown in Table 2, monomagnesium phosphate ($Mg(H_2PO_4)_2$) and 85% phosphoric acid ($H_3PO_4$) aqueous solution as phosphate ion sources and zirconia sol (BIRAL Zr-C20 from Taki Chemical Co., Ltd.) as a particulate metal compound source (metal element: Zr). Further, each solution B shown in Table 2 was similarly prepared by using zirconia sol and 85% phosphoric acid aqueous solution. The volume of each solution was adjusted by using pure water.

A 400 mL of a treatment solution for forming an insulating coating was prepared by mixing 200 mL of the solution A and 200 mL of the solution B and subjecting, 20 seconds after the mixing, to stirring treatment with a turbine stator-type disperser (L5M-A from Silverson Machines, Inc.) for 1 minute.

Next, a 0.23 mm-thick finish-annealed grain-oriented electrical steel sheet was prepared. The grain-oriented electrical steel sheet was pickled with phosphoric acid and, after application of each treatment solution for forming an insulating coating shown in Table 2 at a coating weight after drying of 30 g/m$^2$ as the total coating weight on both surfaces, subjected to baking treatment under conditions of 850° C., 30 seconds, and 100% $N_2$ atmosphere. Subsequently, specimens for the tests described hereinafter were obtained by cutting. Specimens for an applied tension test were later subjected to stress relief annealing at 800° C. for 2 hours in 100% $N_2$ atmosphere.

The insulating coating characteristics of the thus-obtained grain-oriented electrical steel sheet were investigated. Herein, the insulating coating characteristics were evaluated as follows.

(1) Applied Tension

A tension applied to a steel sheet was regarded as a tension in the rolling direction and calculated using the following formula (1) from the magnitude of deflection of the steel sheet after removing a coating on one surface by using an alkali, an acid, or the like.

$$\text{Tension applied to steel sheet [MPa]} = \text{Young's modulus of steel sheet [GPa]} \times \text{sheet thickness [mm]} \times \text{magnitude of deflection [mm]} \div (\text{deflection measurement length [mm]})^2 \times 10^3 \quad \text{formula (1)}$$

Here, the Young's modulus of steel sheet was set to 132 GPa.

An applied tension of 8.0 MPa was evaluated as satisfactory.

(2) Resistance to Moisture Absorption

The resistance to moisture absorption was evaluated by a leaching test of phosphorus. In this test, three specimens of 50 mm×50 mm were boiled in distilled water at 100° C. for 5 minutes to measure the amount of phosphorus leached [μg/150 cm$^2$] and evaluated as the ease of dissolution in water of a tensile coating. The leached amount of 150 [μg/150 cm$^2$] or less was evaluated as satisfactory (excellent in resistance to moisture absorption). The amount of leached P was measured through quantitative analysis by ICP atomic emission spectroscopy.

(3) Coating Appearance

Each insulating coating after stress relief annealing was visually evaluated in terms of luster and uniformity in appearance. Here, an insulating coating without visually observed luster was determined as rough.

(4) Stacking Factor

A stacking factor was measured by the method stipulated in JIS C 2550. The value of stacking factor varies depending on sheet thicknesses, and 96.0% or more was evaluated as satisfactory for 0.23 mm-thick steel sheets of the present working examples.

(5) Interlaminar Insulation

The interlaminar insulation was measured in accordance with the method A among measurement methods in the interlaminar resistance test described in JIS C 2550. The total current value that flows a contact was regarded as interlaminar resistance, and the value of 0.20 A or less was evaluated as satisfactory.

The results are shown in Table 2.

TABLE 2

| | Treatment solution for forming insulating coating | | | | | | | |
|---|---|---|---|---|---|---|---|---|
| | Solution A | | | Solution B | | | | |
| No | Type | Phosphate ion concentration (mol/L) | Zr concentration (mol/L) | Type | Zr concentration (mol/L) | Phosphate ion concentration (mol/L) | Peripheral speed at stirring blade tip (m/s) | Total coating weight of insulating coatings on both surfaces (g/m$^2$) |
| 1 | A-1 | 0.10 | 0.00 | B-1 | 0.30 | 0.00 | 12.0 | 2.8 |
| 2 | A-1 | 0.10 | 0.00 | B-2 | 0.50 | 0.00 | 12.0 | 3.0 |
| 3 | A-2 | 0.20 | 0.00 | B-3 | 1.60 | 0.00 | 15.0 | 6.4 |
| 4 | A-3 | 3.50 | 0.20 | B-6 | 3.40 | 0.00 | 12.0 | 8.6 |
| 5 | A-4 | 3.50 | 0.48 | B-3 | 1.60 | 0.00 | 10.0 | 8.3 |
| 6 | A-5 | 3.50 | 1.00 | B-6 | 3.40 | 0.00 | 13.0 | 9.6 |
| 7 | A-6 | 4.30 | 0.20 | B-9 | 26.00 | 0.00 | 20.0 | 10.8 |
| 8 | A-7 | 4.50 | 0.00 | B-3 | 1.60 | 0.00 | 13.0 | 10.0 |
| 9 | A-8 | 5.00 | 0.00 | B-4 | 1.60 | 0.18 | 13.0 | 10.3 |
| 10 | A-8 | 5.00 | 0.00 | B-5 | 1.60 | 0.25 | 12.0 | 10.6 |
| 11 | A-9 | 8.00 | 0.00 | B-6 | 3.40 | 0.00 | 15.0 | 11.3 |
| 12 | A-10 | 10.00 | 0.00 | B-8 | 20.00 | 0.00 | 15.0 | 11.7 |
| 13 | A-11 | 12.20 | 0.00 | B-7 | 4.30 | 0.00 | 15.0 | 12.3 |

| | Evaluation | | | | | |
|---|---|---|---|---|---|---|
| No | Interlaminar insulation | Applied tension (MPa) | Amount of phosphorus leached (μg/150 cm$^2$) | Appearance | Stacking factor | Note |
| 1 | poor | 2.4 | 80 | uniform | 97.2 | Comp. Ex. |
| 2 | poor | 2.6 | 120 | uniform | 97.1 | Comp. Ex. |
| 3 | satisfactory | 8.1 | 15 | uniform | 96.8 | Ex. |
| 4 | satisfactory | 8.8 | 8 | uniform | 96.5 | Ex. |
| 5 | satisfactory | 8.4 | 10 | uniform | 96.0 | Ex. |
| 6 | satisfactory | 6.4 | 360 | rough | 95.5 | Comp. Ex. |
| 7 | satisfactory | 5.3 | 210 | rough | 95.4 | Comp. Ex. |
| 8 | satisfactory | 12.6 | 20 | uniform | 96.7 | Ex. |
| 9 | satisfactory | 11.6 | 18 | uniform | 96.8 | Ex. |
| 10 | satisfactory | 6.3 | 280 | rough | 95.3 | Comp. Ex. |
| 11 | satisfactory | 11.3 | 20 | uniform | 96.7 | Ex. |
| 12 | satisfactory | 12.8 | 25 | uniform | 96.6 | Ex. |
| 13 | satisfactory | 5.4 | 860 | rough | 95.2 | Comp. Ex. |

As shown in Table 2, it is revealed that satisfactory insulating coating characteristics are achieved in all the Examples.

Example 2

<Investigation of Stirring Methods>

As a raw material of a treatment solution for forming an insulating coating, a solution A containing, as shown in Table 3, each phosphate salt and 85% phosphoric acid ($H_3PO_4$) aqueous solution as phosphate ion sources and colloidal silica (ST-C from Nissan Chemical Corporation) was prepared. Further, a solution B shown in Table 3 was similarly prepared by using titania sol (NTB-100 from Showa Denko K. K.) and/or magnesium oxide (vapor phase process MgO (500A) from Ube Material Industries, Ltd.) as particulate metal compound sources. The volume of each solution was adjusted to 1,000 L in total by using pure water. Here, both the concentration of a particulate metal compound in the solution A and the concentration of phosphate ions in the solution B are 0 mol/L.

A 400 L of a treatment solution was prepared by mixing 200 L of the solution A and 200 L of the solution B and subjecting to stirring treatment under the stirring conditions shown in Table 3. The stirring time was set to 2 minutes for all the working examples.

Next, a 0.20 mm-thick finish-annealed grain-oriented electrical steel sheet was prepared. The grain-oriented electrical steel sheet was pickled with phosphoric acid and, after application of each insulating coating treatment solution shown in Table 3 at a coating weight of insulating coatings after drying on both surfaces of 15 g/m$^2$, subjected to baking treatment under conditions of 900° C., 30 seconds, and 100% $N_2$ atmosphere. Subsequently, specimens for the tests described hereinafter were obtained by cutting. Specimens for an applied tension test were later subjected to stress relief annealing at 800° C. for 2 hours in 100% $N_2$ atmosphere.

The insulating coating characteristics of the thus-obtained grain-oriented electrical steel sheet were investigated. As the insulating coating characteristics, applied tension, resistance to moisture absorption, appearance, and stacking factor were evaluated by the same methods as Example 1. Here, the value of stacking factor varies depending on sheet thicknesses, and 95.0% or more was evaluated as satisfactory for the sheet thickness of 0.20 mm of the present working examples.

The results are shown in Table 3.

TABLE 3

| No | Treatment solution for forming insulating coating – Solution A – Phosphoric acid (kg) (solids content basis): Magnesium phosphate | Calcium phosphate | Barium phosphate | Strontium phosphate | Zinc phosphate | Aluminum phosphate | Manganese phosphate | Phosphoric acid ($H_3PO_4$) | Phosphate ion concentration (mol/L) | Colloidal silica (kg) (solids content basis) | Solution B – Solids content basis (Kg): $TiO_2$ | MgO |
|---|---|---|---|---|---|---|---|---|---|---|---|---|
| 1 | 450 | | | | | | | | 4.12 | 250 | 50 | |
| 2 | 450 | | | | | | | 50 | 4.63 | 250 | 50 | |
| 3 | 450 | | | | | | | 200 | 6.16 | 200 | 50 | 10 |
| 4 | 450 | | | | | | | | 4.12 | 0 | 50 | 100 |
| 5 | 450 | | | | | | | | 4.12 | 0 | 80 | 100 |
| 6 | 315 | | | | | 180 | | | 4.58 | 300 | 80 | 80 |
| 7 | 135 | | | | | 420 | | | 5.20 | 300 | 80 | |
| 8 | | | | | | 600 | | 20 | 5.87 | 600 | 80 | 10 |
| 9 | | | | | | 600 | | 100 | 6.68 | 1250 | 80 | 100 |
| 10 | | | | | | 600 | | | 5.66 | 800 | 100 | 100 |
| 11 | | | | | | 600 | | 230 | 8.01 | 800 | 100 | 100 |
| 12 | | | | | | 600 | | 300 | 8.72 | 800 | 100 | 50 |
| 13 | | | | | | 600 | | | 5.66 | 0 | 100 | 50 |
| 14 | | 300 | | | | | | | 2.56 | 200 | 100 | 100 |
| 15 | | | 250 | | | | | 10 | 1.61 | 200 | | 100 |
| 16 | | | | 200 | | | | | 1.42 | 150 | 90 | 275 |
| 17 | | | | | 150 | | | | 1.16 | 150 | | 25 |
| 18 | | | | | | 200 | | 30 | 2.19 | 200 | | 30 |
| 19 | | | | | | | 250 | | 2.01 | 200 | | 50 |
| 20 | 400 | | | | | | 90 | | 4.39 | 300 | 100 | |
| 21 | 300 | 60 | | | | | | | 3.26 | 300 | | 50 |
| 22 | 250 | | | | | 50 | | 50 | 3.27 | 300 | | 150 |
| 23 | 250 | | | | 50 | | | | 2.68 | 300 | 100 | |
| 24 | | | 60 | 50 | | | | 100 | 1.74 | 300 | | 150 |
| 25 | 270 | | | | | 230 | | | 4.64 | 300 | | 100 |

| No | Solution B Concentration of particulate meta compound (mol/L) | Stirring conditions: Time after mixing of solutions A and B until start of stirring (s) | Disperser | Peripheral speed at stirring blade tip (m/s) | Evaluation: Applied tension (MPa) | Amount of phosphorus leached (μg/150 cm$^2$) | Appearance | Stacking factor | Note |
|---|---|---|---|---|---|---|---|---|---|
| 1 | 0.63 | 5 | propeller stirrer | 12.0 | 4.6 | 300 | rough | 94.8 | Comp. Ex. |
| 2 | 0.63 | 2 | high shear mixer | 12.0 | 12.6 | 20 | uniform | 96.2 | Ex. |
| 3 | 0.87 | 10 | high shear mixer | 15.0 | 12.8 | 15 | uniform | 96.4 | Ex. |
| 4 | 3.11 | 30 | high shear mixer | 12.0 | 9.5 | 8 | uniform | 96.3 | Ex. |
| 5 | 3.48 | 45 | high shear mixer | 10.0 | 9.4 | 10 | uniform | 96.5 | Ex. |
| 6 | 2.99 | 60 | high shear mixer | 13.0 | 12.3 | 15 | uniform | 96.3 | Ex. |
| 7 | 1.00 | 90 | high shear mixer | 20.0 | 6.8 | 180 | rough | 94.6 | Comp. Ex. |
| 8 | 1.25 | 10 | Cavitron | 15.0 | 12.6 | 20 | uniform | 96.2 | Ex. |
| 9 | 3.48 | 30 | Cavitron | 15.0 | 12.3 | 18 | uniform | 96.1 | Ex. |
| 10 | 3.73 | 30 | Cavitron | 15.0 | 12.5 | 11 | uniform | 95.9 | Ex. |
| 11 | 3.73 | 120 | Cavitron | 15.0 | 5.7 | 340 | rough | 94.9 | Comp Ex. |
| 12 | 2.49 | 10 | Cavitron | 20.0 | 12.8 | 25 | uniform | 96.4 | Ex. |
| 13 | 2.49 | 10 | propeller stirrer | 20.0 | 5.4 | 860 | rough | 94.7 | Comp. Ex. |
| 14 | 3.73 | 10 | ultrasonic homogenizer | | 3.1 | 1500 | rough | 93.9 | Comp. Ex. |
| 15 | 2.48 | 15 | high shear mixer | 13.0 | 12.8 | 25 | uniform | 96.4 | Ex. |
| 16 | 7.95 | 15 | high shear mixer | 25.0 | 12.2 | 23 | uniform | 96.3 | Ex. |
| 17 | 0.62 | 15 | high shear mixer | 25.0 | 12.7 | 10 | uniform | 96.1 | Ex. |
| 18 | 0.74 | 15 | high shear mixer | 13.0 | 11.6 | 27 | uniform | 96.2 | Ex. |

TABLE 3-continued

| | | | | | | | | | |
|---|---|---|---|---|---|---|---|---|---|
| 19 | 1.24 | 25 | Cavitron | 13.0 | 12.8 | 26 | uniform | 96.4 | Ex. |
| 20 | 1.25 | 25 | Cavitron | 30.0 | 12.9 | 15 | uniform | 96.5 | Ex. |
| 21 | 1.24 | 25 | Cavitron | 30.0 | 12.3 | 24 | uniform | 96.4 | Ex. |
| 22 | 3.72 | 30 | high shear mixer | 25.0 | 11.7 | 22 | uniform | 96.3 | Ex. |
| 23 | 1.25 | 30 | Quadro Ytron Z | 25.0 | 11.9 | 12 | uniform | 96.3 | Ex. |
| 24 | 3.72 | 30 | Quadro Ytron Z | 13.0 | 12.0 | 26 | uniform | 95.8 | Ex. |
| 25 | 2.48 | 30 | high shear mixer | 13.0 | 11.8 | 26 | uniform | 96.0 | Ex. |

As shown in Table 3, it is revealed that satisfactory insulating coating characteristics are achieved in all the Examples.

Example 3

<High-Pressure Dispersion Treatment and so Forth>

As a raw material of a treatment solution for forming an insulating coating, a solution A containing, as shown in Table 3, each phosphate salt and 85% phosphoric acid ($H_3PO_4$) aqueous solution as phosphate ion sources and colloidal silica (ST-O from Nissan Chemical Corporation) was prepared. Further, a solution B shown in Table 4 was similarly prepared by using $Al_2O_3$(BIRAL Al-C20 from Taki Chemical Co., Ltd.), ZnO (MZ-300 from Tayca Corporation), $Y_2O_3$, $HfO_2$, $ZrCa(PO_4)_2$, and/or $Zr_2WO_4(PO_4)_2$ (all commercial chemicals pulverized into particle size of 0.5 μm) as particulate metal compound sources. The volume of each solution was adjusted to 1,000 L in total by using pure water.

Each 200 L of the solution A and the solution B were mixed and subjected, 10 seconds after the mixing, to stirring treatment for about 5 minutes using a high shear mixer from Silverson Machines, Inc. In some of the working examples, the resulting mixed solution was further subjected, after the stirring treatment, to dispersion treatment with the high-pressure homogenizer shown in Table 4.

Next, a 0.27 mm-thick finish-annealed grain-oriented electrical steel sheet was prepared. The grain-oriented electrical steel sheet was pickled with phosphoric acid and, after application of any of various insulating coating treatment solutions shown in Table 4 at a coating weight of insulating coatings after drying on both surfaces of 8.0 $g/m^2$, subjected to baking treatment under conditions of 820° C., 30 seconds, and 100% $N_2$ atmosphere. Subsequently, specimens for the tests described hereinafter were obtained by cutting. Specimens for an applied tension test were later subjected to stress relief annealing at 800° C. for 2 hours in 100% $N_2$ atmosphere.

The insulating coating characteristics of the thus-obtained grain-oriented electrical steel sheet were investigated. As the insulating coating characteristics, applied tension, resistance to moisture absorption, appearance, and stacking factor were evaluated by the same methods as Example 1. Here, the value of stacking factor varies depending on sheet thicknesses, and 97.0% or more was evaluated as satisfactory for the sheet thickness of 0.27 mm of the present working examples.

The results are shown in Table 4.

TABLE 4

| | Treatment solution A | | | | | Treatment solution B | | | | | | |
|---|---|---|---|---|---|---|---|---|---|---|---|---|
| | Phosphoric acid (kg) (solids content basis) | | | Phosphate ion | Colloidal silica (kg) (solids | Solids content basis (kg) | | | | | | Concentration of particulate metal |
| No | Magnesium phosphate | Aluminum phosphate | Phosphoric acid ($H_3PO_4$) | concentration (mol/L) | content basis) | $Al_2O_3$ | ZnO | $Zr_2WO_4$ $(PO_4)_2$ | ZrCa $(PO_4)_2$ | $Y_2O_3$ | $HfO_2$ | compound (mol/L) |
| 1 | 450 | | | 4.12 | 250 | 80 | | | | | | 1.57 |
| 2 | 450 | | 50 | 4.63 | 250 | 50 | 50 | | | | | 2.21 |
| 3 | 450 | | 200 | 6.16 | 200 | | | 120 | | | | 0.58 |
| 4 | 450 | | | 4.12 | 0 | | | | | 70 | | 0.62 |
| 5 | 450 | | | 4.12 | 0 | | 100 | | | | | 2.46 |
| 6 | 315 | 180 | | 4.58 | 300 | | | | 150 | | | 0.93 |
| 7 | 135 | 420 | | 5.20 | 300 | | 50 | | | | 50 | 1.47 |
| 8 | | 600 | 20 | 5.87 | 600 | | | | | | 120 | 0.57 |
| 9 | | 600 | 100 | 6.68 | 1250 | 30 | | 20 | | | | 0.69 |
| 10 | | 600 | | 5.66 | 800 | 30 | | | 20 | | | 0.71 |
| 11 | | 600 | 230 | 8.01 | 800 | | 90 | | | 10 | | 2.30 |
| 12 | | 600 | 300 | 8.72 | 800 | 25 | 10 | | 10 | | 5 | 0.82 |
| 13 | | 600 | | 5.66 | 0 | 25 | 10 | 10 | | 5 | | 0.83 |

| | Dispersion treatment after stirring treatment | | Evaluation | | | | |
|---|---|---|---|---|---|---|---|
| | | | Applied | Amount of phosphorus | | | |
| No | High-pressure homogenizer | Pressure (MPa) | tension (MPa) | leached (μg/150 $cm^2$) | Appearance | Stacking factor | Note |
| 1 | | | 8.2 | 20 | uniform | 97.2 | Ex. |
| 2 | Star Burst | 50 | 10.6 | 9 | uniform | 98.0 | Ex. |
| 3 | Star Burst | 100 | 10.2 | 8 | uniform | 98.1 | Ex. |
| 4 | | | 9.5 | 18 | uniform | 97.1 | Ex. |
| 5 | Star Burst | 250 | 10.3 | 5 | uniform | 98.3 | Ex. |

TABLE 4-continued

| | | | | | | | |
|---|---|---|---|---|---|---|---|
| 6 | NanoVater | 50 | 10.7 | 5 | uniform | 98.0 | Ex. |
| 7 | | | 8.1 | 25 | uniform | 97.3 | Ex. |
| 8 | NanoVater | 150 | 10.9 | 7 | uniform | 98.1 | Ex. |
| 9 | NanoVater | 250 | 10.1 | 5 | uniform | 98.3 | Ex. |
| 10 | Nano Jet Pul | 100 | 10.6 | 5 | uniform | 98.2 | Ex. |
| 11 | | | 8.3 | 30 | uniform | 97.0 | Ex. |
| 12 | Nano Jet Pul | 200 | 10.2 | 6 | uniform | 98.3 | Ex. |
| 13 | Nano Jet Pul | 250 | 10.8 | 5 | uniform | 98.4 | Ex. |

As shown in Table 4, satisfactory insulating coating characteristics are achieved in all the Examples. Moreover, it is revealed that the respective characteristics of applied tension, the amount of phosphorus leached, and stacking factor are significantly improved by performing treatment with a high-pressure homogenizer.

In Examples 2 and 3, it was possible to ship all the Examples as final products by applying the production method for a treatment solution for forming an insulating coating of the disclosed embodiments, thereby enhancing productivity.

Example 4

The particle size distribution was measured for No. 11 treatment solution for forming an insulating coating shown in Table 2 by using an ultrasonic particle size distribution analyzer (OPUS from Japan Laser Corporation). As a result, the particle size (D50, median diameter) was 0.087 μm. The treatment solution was further subjected to additional stirring treatment for 1 minute using a turbine stator-type disperser (L5M-A from Silverson Machines Inc.) as in Example 1. Consequently, it was confirmed that the degree of dispersion was enhanced to the average particle size (D50, median diameter) of 0.0083 μm. Further, the insulating coating characteristics were evaluated in the same manner as Example 1. From the results of the applied tension of 12.6 MPa and the amount of phosphorus leached of 11 $\mu g/150\ cm^2$, it was confirmed that better characteristics than those before the additional stirring treatment were exhibited.

In the production of a treatment solution for forming an insulating coating containing phosphate ions and one or more particulate metal compounds, when applying a method of using various particulate metal compounds for the purpose of effectively preventing deterioration in resistance to moisture absorption due to leaching of phosphate ions or for the purpose of increasing tension applied to a steel sheet by the insulating coating, there was a problem of dispersing such particulate metal compounds in the treatment solution for forming an insulating coating. However, as in the foregoing, according to the disclosed embodiments, it is possible to disperse such particulate metal compounds at a low cost in a stable manner compared with a high-cost method of surface treatment and, as a result, to obtain a treatment solution that can form an insulating coating having high applied tension and resistance to moisture absorption.

The invention claimed is:

1. A production method for a treatment solution for forming an insulating coating, the treatment solution comprising at least one of (i) phosphoric acid and (ii) a phosphate salt, and one or more particulate metal compounds, the method comprising:

mixing a solution A comprising, on a $PO_4^{3-}$ basis, in a range of 0.20 mol/L or more and 10 mol/L or less of the at least one of (i) phosphoric acid and (ii) the phosphate salt, and comprising, on a metal basis, less than 0.50 mol/L of the one or more particulate metal compounds, and a solution B comprising, on a metal basis, in a range of 0.50 mol/L or more and 20.0 mol/L or less of the one or more particulate metal compounds, and comprising, on a $PO_4^{3-}$ basis, less than 0.20 mol/L of the at least one of (i) phosphoric acid and (ii) the phosphate salt; and stirring the mixture with a rotor-stator high-speed stirrer such that a peripheral speed of a rotor of the stirrer is 10 m/s or more while stirring the mixture within 60 seconds after starting the mixing of the solution A and the solution B.

2. The production method for a treatment solution for forming an insulating coating according to claim 1, further comprising, after the stirring of the mixture with the high-speed stirrer, performing dispersion treatment on the mixture with a high-pressure homogenizer at a pressure of 20 MPa or more.

3. The production method for a treatment solution for forming an insulating coating according to claim 2, wherein the treatment solution for forming the insulating coating further comprises colloidal silica.

4. The production method for a treatment solution for forming an insulating coating according to claim 2, wherein the one or more particulate metal compounds comprise at least one element selected from the group consisting of Mg, Al, Ti, Zn, Y, Zr, and Hf.

5. The production method for a treatment solution for forming an insulating coating according to claim 2, wherein the one or more particulate metal compounds include at least one oxide.

6. The production method for a treatment solution for forming an insulating coating according to claim 1, wherein the treatment solution for forming the insulating coating further comprises colloidal silica.

7. The production method for a treatment solution for forming an insulating coating according to claim 6, wherein the one or more particulate metal compounds comprise at least one element selected from the group consisting of Mg, Al, Ti, Zn, Y, Zr, and Hf.

8. The production method for a treatment solution for forming an insulating coating according to claim 7, wherein the one or more particulate metal compounds include at least one oxide.

9. The production method for a treatment solution for forming an insulating coating according to claim 6, wherein the one or more particulate metal compounds include at least one oxide.

10. The production method for a treatment solution for forming an insulating coating according to claim 1, wherein the one or more particulate metal compounds comprise at least one element selected from the group consisting of Mg, Al, Ti, Zn, Y, Zr, and Hf.

11. The production method for a treatment solution for forming an insulating coating according to claim 10, wherein the one or more particulate metal compounds include at least one oxide.

12. The production method for a treatment solution for forming an insulating coating according to claim 1, wherein the one or more particulate metal compounds include at least one oxide.

13. The production method for a treatment solution for forming an insulating coating according to claim 1, wherein the one or more particulate metal compounds include at least one nitride.

14. The production method for a treatment solution for forming an insulating coating according to claim 1, wherein the one or more particulate metal compounds have a particle size in a range of 3.0 nm or more and 2.0 μm or less.

15. A production method for a steel sheet having an insulating coating, the method comprising:

applying to a surface of a steel sheet a treatment solution for forming an insulating coating obtained by the production method according to claim 1; and then baking the steel sheet that has the treatment solution applied to the surface.

16. The production method for a steel sheet having an insulating coating according to claim 15, wherein the steel sheet is a grain-oriented electrical steel sheet.

* * * * *